United States Patent
Koh et al.

(10) Patent No.: US 10,286,298 B1
(45) Date of Patent: *May 14, 2019

(54) DYNAMICALLY ADJUSTING VIRTUAL REWARDS PRESENTED IN OFFERS

(71) Applicant: ELECTRONIC ARTS INC., Redwood City, CA (US)

(72) Inventors: James Koh, Mountain View, CA (US); Kellen Christopher Smalley, Pleasanton, CA (US)

(73) Assignee: ELECTRONIC ARTS INC., Redwood City, CA (US)

(*) Notice: Subject to any disclaimer, the term of this patent is extended or adjusted under 35 U.S.C. 154(b) by 801 days.

This patent is subject to a terminal disclaimer.

(21) Appl. No.: 13/921,092

(22) Filed: Jun. 18, 2013

(51) Int. Cl.
- *A63F 9/24* (2006.01)
- *A63F 13/00* (2014.01)
- *G06F 17/00* (2019.01)
- *G06F 19/00* (2018.01)

(52) U.S. Cl.
CPC .................. *A63F 13/00* (2013.01)

(58) Field of Classification Search
USPC .... 463/20, 22, 25, 39, 42; 705/1, 14, 35, 30
See application file for complete search history.

(56) References Cited

U.S. PATENT DOCUMENTS

| | | | | |
|---|---|---|---|---|
| 8,454,434 B1* | 6/2013 | Schaefer | ................. | G06F 17/00 463/20 |
| 2003/0149575 A1* | 8/2003 | Kwan | .................... | G06Q 10/10 705/34 |
| 2004/0019900 A1* | 1/2004 | Knightbridge | ..... | G06Q 30/0207 725/23 |
| 2008/0221961 A1* | 9/2008 | James | .................... | G06Q 10/06 705/7.14 |
| 2009/0182677 A1* | 7/2009 | Otto | .................. | G06Q 30/0212 705/80 |
| 2011/0314557 A1 | 12/2011 | Marshall | ......................... | 726/27 |
| 2012/0036003 A1* | 2/2012 | Tong | ................. | G06Q 30/0207 705/14.39 |
| 2012/0123924 A1* | 5/2012 | Rose | ...................... | G06Q 20/12 705/35 |
| 2012/0289330 A1 | 11/2012 | Leydon et al. | ................. | 463/31 |
| 2013/0013391 A1* | 1/2013 | Douglas | ............. | G06Q 30/0241 705/14.39 |
| 2013/0103476 A1* | 4/2013 | Carpenter | .......... | G06Q 30/0229 705/14.21 |
| 2013/0218648 A1* | 8/2013 | Fargo | ................. | G06Q 30/0217 705/14.2 |

\* cited by examiner

*Primary Examiner* — Adetokunbo O Torimiro
(74) *Attorney, Agent, or Firm* — Knobbe, Martens, Olson & Bear, LLP

(57) ABSTRACT

This disclosure relates to presenting offers for in-game virtual rewards to users. In implementations, revenue information may be determined that represents revenue to be remitted to a virtual space provider based on acceptance of the offers by the users, a revenue goal may be determined, and rewards of virtual currency associated with presented offers may be determined, such that a first reward of virtual currency is adjusted based on a comparison of the revenue information with the revenue goal.

20 Claims, 4 Drawing Sheets

DYNAMICALLY ADJUSTING VIRTUAL REWARDS PRESENTED IN OFFERS

FIELD OF THE DISCLOSURE

This disclosure relates to presenting offers for in-game virtual rewards, where rewards of virtually currency associated with offers are adjusted based on received revenue and a revenue goal.

BACKGROUND

The popularity of online games has grown over the years. Conventional online games are provided through gaming platforms, such as Facebook.com, Kabam.com, Zynga.com, Bigpoint Games, Steam, etc. Online game providers may present offers to users of the online game via an offer wall on a webpage or mobile interface. The offers presented to users of the online game may include a number of different activities that can be performed by the users in exchange for rewards. The offers may include activities such as applying for a credit card, subscribing to a streaming content service (e.g., Netflix®), taking a survey, watching a promotional video, and/or other activities. Conventionally, offer walls are offered by online game providers where users of the online game may perform the activity associated with an offer in exchange for in-game rewards which they would otherwise have to purchase with real world currency.

Conventionally, offers within an offer wall are provided to the online game provider by an offer broker. The offer broker may have a relationship with the online game provider and with the entities associated with the activities to be performed (e.g. the credit card company, Netflix®, the survey provider, etc.). The offer broker may negotiate deals with such entities where the offer broker is paid a certain amount of money for each person who performs a certain desired activity. The offer broker may then share these deals with one or more game providers, which can create offers from the deals and place them on an offer wall. When a user completes an activity associated with an offer, the offer broker receives real world currency per the broker's deal with the entities, a portion of which is shared with the game provider, and the user may receive an in-game reward from the online game provider.

Conventionally, the in-game rewards presented to the user from the online game provider are fixed. Therefore, if an offer to subscribe to a streaming media provider is presented to the user through the offer wall, the virtual reward for the offer presented to the user remains the same over time. Thus, if the user is disinclined to take an action for a virtual reward associated with an offer from the online game provider, the offer may use valuable virtual real estate on the offer wall or the user may have performed the action for a virtual reward that is less than the presented virtual reward. However, with conventional offer walls there is no way of determining if the user would have performed the activity associated with an offer for a virtual reward that is less than the presented virtual reward.

Accordingly, alternative approaches for presenting offers within an offer wall may encourage users to accept the offers and at low cost to the game provider.

SUMMARY

One aspect of this disclosure relates to determining rewards of virtual currency associated with offers presented to users so that the rewards of virtual currency are adjusted based on revenue due to the virtual space provider based on acceptance of the offers by the users and a revenue goal. In contrast, conventionally virtual rewards within an offer presented to the user remains static and also the revenue received if the user accepts the offers remains static. Thus, a virtual reward within an offer may be adjusted to encourage users to accept the offer while achieving the revenue goal.

In implementations, a system may include one or more processors configured to execute computer program modules. The computer program modules may include a space module, an offer reception module, an offer presentation module, a revenue tracking module, a revenue goal module, and a reward module.

The space module may be configured to execute an instance of a virtual space. The space module may also be configured to use the instance of the virtual space to facilitate interaction with the virtual space by users via client computing devices. The users, including a first user, may interact with the virtual space through a client computing device.

The offer reception module may be configured to receive information associated with one or more offers from one or more offer providers. The offers may include a first offer from a first offer provider. The first offer may be associated with a first action, a first reward of virtual currency usable in the virtual space, and a first amount of revenue to be remitted to a virtual space provider responsive to any user accepting the first offer and performing the first action.

The offer presentation module may be configured to effectuate presentation of the offers to the users on the client computing devices through an offer interface.

The revenue tracking module may be configured to determine revenue information that represents revenue to be remitted to the virtual space provider based on acceptance of the offers by the users.

The revenue goal module may be configured to obtain a revenue goal. Obtaining the revenue goal may include receiving the revenue goal, accessing the revenue goal, determining the revenue goal, etc.

The reward module may be configured to determine the rewards of virtual currency associated with the offers, such that the first reward of virtual currency is adjusted based on a comparison of the revenue information with the revenue goal. In implementations, the reward module may be configured to dynamically adjust the rewards of virtual currency to achieve the revenue goal.

In implementations, the revenue goal may be associated with the revenue information over a period of time. The reward module may be configured to adjust the rewards upward when the revenue information is on pace to miss the revenue goal, and to adjust the rewards downward when the revenue information is on pace to exceed the revenue goal.

In implementations, the revenue goal may be associated with a revenue generation rate, at which revenue to be remitted to the virtual space provider accumulates. Thus instead of the goal being a total amount of revenue generated over a period of time such as a day or a month, the goal may be a rate of a certain amount of revenue per hour or the like. The revenue goal may be dynamic over a period of time, and the goal rate may change based on at least one of a time of day, a day of the week, and a day of the year. Thus, the revenue goal rate may be higher in the evenings when more users may be active and lower during the day when fewer users may be active, and/or higher on the weekends and lower on week days, etc. The reward module may be configured to adjust the rewards upward when the revenue generation rate is below the revenue goal, and to adjust the rewards downward when the revenue generation rate is above the revenue goal.

The revenue generation rate may be calculated based on actual accumulation of revenue to be remitted over a period of time. For example, the average hourly rate at which revenue accumulated over the past day, week or month may be used as the revenue generation rate. Whether an hourly rate or a per minute rate, per second rate, etc. is used may depend on the volume of offers being completed and/or the number of users within the virtual space. For example, if a virtual space provider has a large number of users and dozens of offers being accepted every minute, per minute data may be useful and accurate, and therefore the revenue goal may be a per-minute generation rate. On the other hand if there are only a few active users and only a handful of offers are being completed per hour, per minute data may not be useful because many minutes may have no accepted offers regardless of the rewards offered, simply because no user viewed the offer wall during that minute.

The revenue generation rate may also be calculated based on predicted accumulation of revenue to be remitted over an upcoming period of time. Such predictions may be based on a number of factors, such as recent trends (including actual revenue to be remitted accumulated over a period of time), historical information, number of active users, time of day, day of the week and of the year, the particular users who are active and their offer acceptance history, the offers currently available to users and their associated rewards, etc. If the predicted revenue generation rate is below the revenue goal, virtual rewards are increased, and vice versa.

In implementations, the dynamic alteration of the offers presented based on the revenue goal comprises maximizing the visibility to the first user of offers similar to those the first user has accepted in the past in order to increase revenue generation.

In implementations, the rewards of virtual currency are limited by a maximum virtual currency reward threshold.

These and other features and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural references unless the context clearly dictates otherwise.

DETAILED DESCRIPTION

Figure 1:
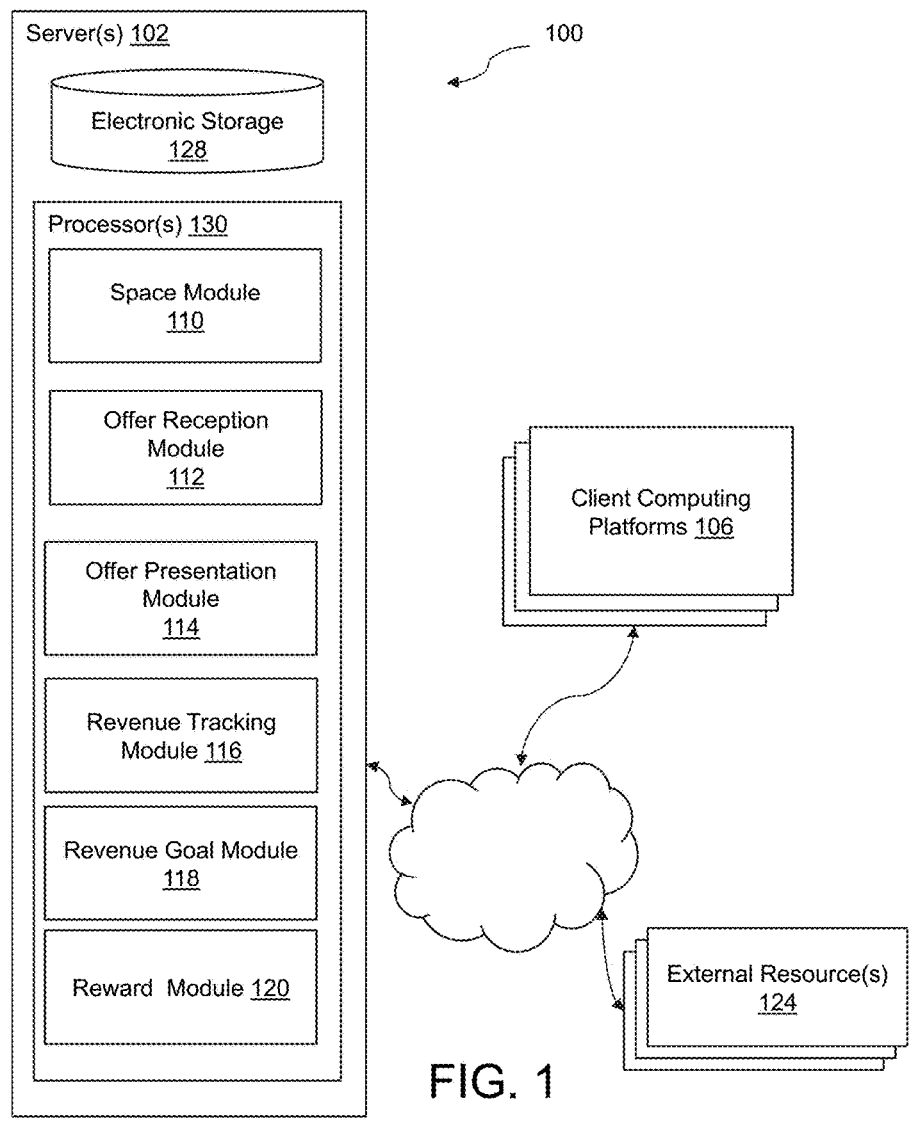
FIG. 1 illustrates a system configured to present offers for in-game virtual rewards, in accordance with one or more implementations.

FIG. 1 illustrates a system 100 configured to provide a virtual space to users. Providing the virtual space may include hosting the virtual space over a network. In some implementations, system 100 may include one or more servers 102. The server(s) 102 may be configured to communicate with one or more client computing platforms 106 according to a client/server architecture. The users may access system 100 and/or the virtual space via client computing platforms 106, to engage in one or more online games, in addition to other activities.

System 100 is only one example of a suitable computing environment and is not intended to suggest any limitation as to the scope of use or functionality of the features described herein. Providing the virtual space may include hosting the virtual space over a network. In this disclosure, rewards of virtual currency associated with offers presented to users may be adjusted upward or downward to achieve a revenue goal. Further, the rewards of virtual currency may be adjusted to maintain the received revenue at, or near, the revenue goal (e.g., so as not to exceed the revenue goal). Virtual currency rewards associated with the offers may be determined dynamically so as to meet the revenue goal without exceeding it. Therefore, the revenue goal and the revenue received may be utilized to adjust the virtual currency rewards within presented offers. If it is desired to increase the remitted revenue to the virtual space provider, then the rewards of virtual currency may be increased. If the remitted revenue to the virtual space provider is above the revenue goal (e.g. above a revenue goal rate or the remitted revenue is expected to be above the revenue goal over the time period) the virtual currency associated with at least one of the offers may be decreased.

Server(s) 102 may be configured to host one or more online games for one or more gaming providers or games hosted on server(s) 102, and to execute one or more computer program modules associated with the online games to provide access to the online games to a plurality of users. The computer program modules may include one or more of a space module 110, an offer reception module 112, an offer presentation module 114, a revenue tracking module 116, a revenue goal module 118, and a reward module 120. As noted, the client computing platforms 106 may include one or more computer program modules that are the same as or similar to the computer program modules of the server(s) 102 to facilitate actions.

Space module 110 may be configured to implement the instance of the virtual space executed by the modules. Space module 110 may also be configured to use the instance of the virtual space to facilitate interaction with the virtual space by users via client computing platforms 106. In implementations, users including a first user may interact with the virtual space through client computing platform 106. The instance of the virtual space may reflect the state of the virtual space. The instance of the virtual space may be used to push state information to clients for implementation on the clients, may be used to verify state information generated on clients executing expressions of the instance locally, and/or for other purposes. State information may include information about the state of the virtual space such as, without limitation, position information of one or more objects, topography information, object status/shape information, battle information, score information, user or character progress information, user inventory information, progress information for one or more activities or actions, view information describing a view of the virtual space, and/or other information that describes the state of the virtual space. Expressions of the instance executed on the clients facilitate presentation of views on the clients of the virtual space. Expressions of the instance executed on the clients may be configured to simply present views of the virtual space based on the state information (e.g., via streaming view information, object/position information, and/or other state information) received from space module 110. Expressions of the instance executed on the client computing platforms 106 may include space logic that effectively provides for execution of a limited version of the instance on a client that is synchronized and/or verified with state information received from space module 110. The view presented on a given client may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via client computing platforms 106 that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the modules may be synchronous, asynchronous, and/or semi-synchronous.

The above description of the views of the virtual space determined from the instance executed by space module 110 is not intended to be limiting. The virtual space may be presented in a more limited, or more rich, manner. For example, views of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other representations of individual places within the virtual space are contemplated.

Within the instance of the virtual space executed by space module 110, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 106. The users may interact with each other through communications exchanged within the virtual space. Such communications may include one or more of textual chat, instant messages, private messages, voice communications, and/or other communications. Communications may be received and entered by the users via their respective client computing platforms 106. Communications may be routed to and from the appropriate users through server 102 (e.g., through space module 110).

Offer reception module 112 may be configured to receive information associated with one or more offers from one or more offer providers. The offers may be associated with actions that the user may engage in, a virtual reward usable in the virtual space, and an amount of revenue. In implementations, the virtual reward may be virtual currency configured to be used within an online game. The offers may include certain actions, benefits, or activities that are associated with a provider of goods and/or services. For example, the offers may include actions such as applying for a credit card, subscribing to a streaming content service, taking a survey, watching a promotional video, and/or other activities. In implementations, the offer may be provided to offer reception module 112 directly from the provider of goods and/or services or with offer brokers who act as middlemen for one or more such providers. For example, an offer provider may be a credit card company that may communicate an offer to offer reception module 112 with an amount of revenue that is received for each user that fills out an online credit card application.

Offer presentation module 114 may be configured to effectuate presentation of offers to a user on a client computing device 106. In implementations, offer presentation module 114 may be configured to present the offers within an offer interface such as an offer wall, where the offer wall includes a plurality of offers. Offer presentation module 114 may present the offer wall to users within a webpage, a mobile interface, etc. associated with an online game provider. The offers presented to the users may include actions that the user must engage in and a reward of virtual currency usable in the virtual space that the user can receive for engaging in the actions. Offer presentation module 114 may dynamically present the offers to the users on a per user basis where different users may be presented with different offers, and an offer presented to a first user in the offer wall may be removed from the offer wall based on the user participating in the offer. Offer presentation module 114 may also be configured to present the offers to different users based on a history of what offers the users participated in. In implementations, offer presentation module 114 may be configured to dynamically alter the presentation of offers to the first user to maximize the visibility of offers similar to those that the user has accepted in the past in order to increase revenue generation based on a revenue goal. For example, offer presentation module 114 may dynamically alter at least one of the order, size, and location of the offers presented to the user based on the revenue goal.

Revenue tracking module 116 may be configured to determine revenue information that represents revenue to be remitted to the virtual space provider based on acceptance of the offers by the users. Responsive to a user accepting an offer, revenue tracking module 116 may be configured to transmit an indication of the user's acceptance of the offer to an offer provider associated with the accepted offer. In response to receiving the indication of the user's acceptance of the offer, revenue tracking module 116 may receive revenue information, including a first amount of revenue associated with the accepted offer from the offer provider. In implementations, the revenue information may also include a time stamp indicating a time period when the offer was accepted by the user or the revenue was received from the offer provider by revenue tracking module 116.

Revenue goal module 118 may be configured to obtain a revenue goal. The revenue goal may be associated with the amount of currency received by the virtual space provider from one or more offer providers over a period of time. The revenue goal may be any amount of real currency determined based on empirical evidence associated with a number of users that accept offers presented to them, virtual currency associated with the offers, an amount of revenue to be remitted to the virtual space provider responsive to the user accepting an offer, a period of time, and/or other factors. In implementations, the revenue goal may be associated with a revenue generation rate at which revenue to be remitted to the virtual space provider based on users accepting offers accumulates. The revenue generation rate may be calculated based on actual or predicted accumulation of revenue to be remitted over a period of time. The revenue goal may be dynamic over a period of time, wherein the revenue goal may change based on at least one of a time of day, a day of the week, or a day of the year.

Reward module 120 may be configured to determine the rewards of virtual currency associated with the offers, such that a first reward of virtual currency associated with a first offer is adjusted based on a comparison of the revenue information with the revenue goal. In implementations, reward module 120 may be configured to dynamically adjust the rewards of virtual currency to achieve the revenue goal. Reward module 120 may adjust the reward associated with at least one of the offers upward if the revenue information is on pace to miss the revenue goal, and reward module 120 may be configured to adjust the reward associated with at least one of the offers is on pace to exceed the revenue goal. If the revenue goal is a revenue generation rate, reward module 120 may be configured to adjust the rewards upward if the revenue generation rate is below the revenue goal, and reward module 120 may be configured to adjust the rewards downward if the revenue generation rate is above the revenue goal. In implementations, the rewards of virtual currency associated with offers may be limited by a maximum virtual currency reward threshold. The maximum virtual currency reward threshold may be associated with an amount of virtual currency that the virtual space provider transmits or offers to a user or a plurality of users over a time period. In implementations, there may be an individual threshold for each offer, the threshold may apply to the total amount of virtual currency given out by a virtual space provider over a period of time, the threshold may apply to a total amount of virtual currency given to a single user over a period of time, etc. For example, there may be a virtual currency reward threshold of x units of virtual currency for any given month. Maximum virtual currency reward thresholds may help to prevent inflation in the virtual space. Excessive inflation may reduce the value of users' real money purchases and require adjustments of various in-game prices. In implementations, responsive to adjusting the rewards of virtual currency, reward module 120 may be configured to compare the adjusted rewards of virtual currency associated with the offers presented to the users with the maximum virtual currency reward threshold. If the adjusted rewards of virtual currency are above the maximum virtual currency reward threshold, then the rewards of virtual currency may be adjusted downward to the maximum virtual currency threshold. In embodiments where a single virtual currency threshold applies to the total amount of virtual currency given away (and/or the total amount given away to a single user, etc.), the virtual currency rewards associated with various offers may be reduced in any desired manner so as to avoid exceeding the threshold. For example, all rewards may be reduced proportionately such that projected virtual currency rewards do not exceed the threshold.

In implementations, if the rewards of virtual currency are above the maximum virtual currency reward threshold, reward module 120 may be configured to transmit an offer provider request to at least one offer provider associated with offers presented to the users. The offer provider request may include a request for an increase in revenue from the offer providers based on the users accepting a corresponding offer. Responsive to reward module 120 transmitting the offer provider request, reward module 120 may receive an offer provider acceptance indicating that revenue tracking module 116 may receive an increase in revenue received from the offer provider based on a user accepting a corresponding offer. Responsive to receiving the offer provider request, reward module 120 may increase the maximum virtual currency reward threshold.

In some implementations, the server(s) 102, client computing platforms 106, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platforms 106, and/or external resources 124 may be operatively linked via some other communication media.

A given client computing platform 106 may include one or more processors configured to execute computer program modules. The computer program modules may be configured to enable an expert or user associated with the given client computing platform 106 to interface with system 100 and/or external resources 124, and/or provide other functionality attributed herein to client computing platforms 106. By way of non-limiting example, the given client computing platform 106 may include one or more of a desktop computer, a laptop computer, a handheld computer, a tablet computing platform, a NetBook, a Smartphone, a gaming console, and/or other computing platforms.

External resources 124 may include sources of information, hosts and/or providers of virtual environments outside of system 100, external entities participating with system 100, and/or other resources. In some implementations, some or all of the functionality attributed herein to external resources 124 may be provided by resources included in system 100.

Server(s) 102 may include electronic storage 128, one or more processors 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s).

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor 130, information received from server(s), information received from client computing platforms 106, and/or other information that enables server(s) to function as described herein.

Processor(s) 130 is configured to provide information processing capabilities in server(s) 102. As such, processor 130 may include one or more of a digital processor, an analog processor, a digital circuit designed to process information, an analog circuit designed to process information, a state machine, and/or other mechanisms for electronically processing information. Although processor 130 is shown in FIG. 1 as a single entity, this is for illustrative purposes only. In some implementations, processor 130 may include a plurality of processing units. These processing units may be physically located within the same device, or processor 130 may represent processing functionality of a plurality of devices operating in coordination. The processor 130 may be configured to execute modules 110, 112, 114, 116, 118, and 120. Processor 130 may be configured to execute modules 110, 112, 114, 116, 118, and 120 by software; hardware; firmware; some combination of software, hardware, and/or firmware; and/or other mechanisms for configuring processing capabilities on processor 130. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 110, 112, 114, 116, 118, and 120 are illustrated in FIG. 1 as being implemented within a single processing unit, in implementations in which processor 130 includes multiple processing units, one or more of modules 110, 112, 114, 116, 118, and 120 may be implemented remotely from the other modules. The description of the functionality provided by the different modules 110, 112, 114, 116, 118, and 120 described below is for illustrative purposes, and is not intended to be limiting, as any of modules 110, 112, 114, 116, 118, and 120 may provide more or less functionality than is described. For example, one or more of modules 110, 112, 114, 116, 118, and 120 may be eliminated, and some or all of its functionality may be provided by other ones of modules 110, 112, 114, 116, 118, and 120. As another example, processor 130 may be configured to execute one or more additional modules that may perform some or all of the functionality attributed below to one of modules 110, 112, 114, 116, 118, and 120.

Figure 2:
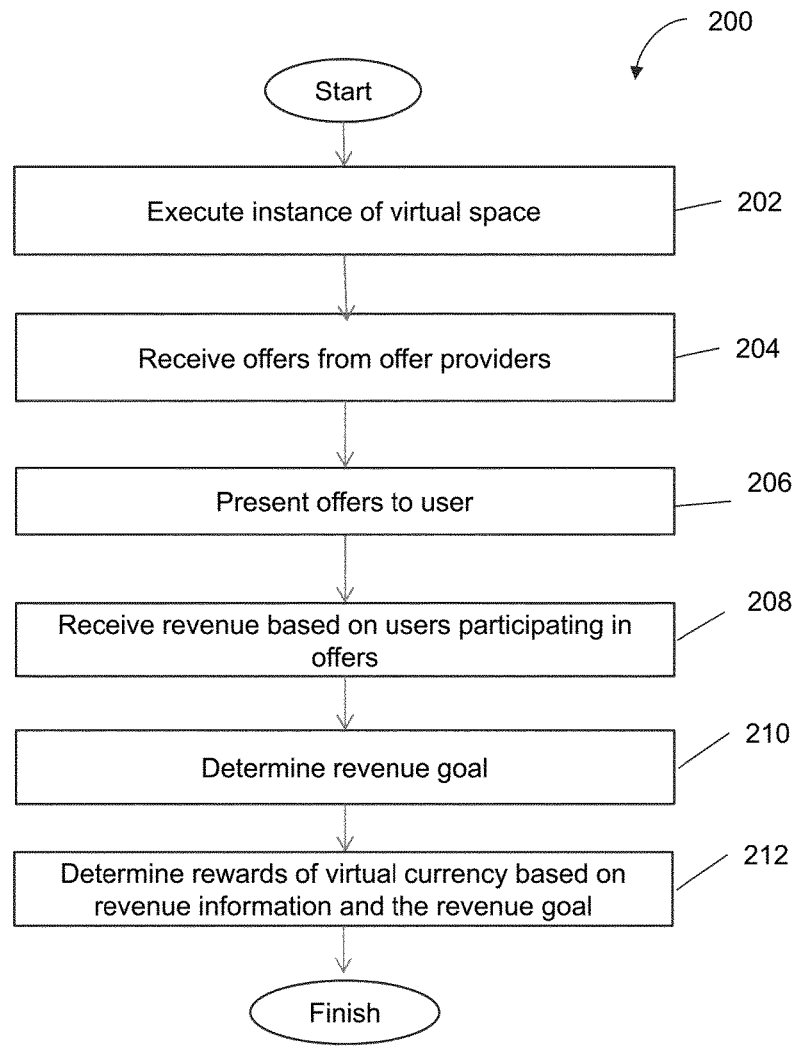
FIG. 2 illustrates a method of presenting offers for in-game virtual rewards, in accordance with one or more implementations.

FIG. 2 illustrates a method of presenting offers for in-game virtual rewards to users. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, an instance of virtual space may be executed to facilitate interaction with the virtual space by users of client computing devices. Operation 202 may be performed by a space module that is the same as or similar to space module 110, in accordance with one or more implementations.

At an operation 204, information associated with one or more offers from one or more offer providers may be received. The offers may include a first offer from a first offer provider. The first offer may be associated with a first action, a first reward of virtual currency usable in the virtual space, and a first amount of revenue. Operation 204 may be performed by an offer reception module that is the same as or similar to offer reception module 112, in accordance with one or more implementations.

At an operation 206, the received offers may be presented to a first user on a first client computing device. The presented first offer may include the first action and a first reward of virtual currency usable in the virtual space that is transmitted to the user in response to the user accepting the offer by performing the first action. Operation 206 may be performed by an offer presentation module that is the same as or similar to offer presentation module 114, in accordance with one or more implementations.

At an operation 208, revenue may be received from the offer providers based on the users participating in the offers, such that responsive to the first user accepting the first offer and the performing the first action, the first amount of revenue is received from the first offer provider. Operation 208 may be performed by a revenue tracking module that is the same as or similar to revenue tracking module 116, in accordance with one or more implementations.

At an operation 210, a revenue goal may be determined (e.g., received, accessed, calculated, etc.). The determined revenue goal may be associated with an amount of revenue remitted to the virtual space provider by the offer providers over a period of time responsive to the users accepting the offers. In implementations, the revenue goal may be a dynamic revenue generation rate goal, at which revenue to be remitted to the virtual space provider accumulates, and changes based on at least a time of day, a day of the week, or a day of the year. Operation 210 may be performed by a revenue goal module that is the same as or similar to revenue goal module 118, in accordance with one or more implementations.

At an operation 212, the rewards of virtual currency associated with the offers may be determined, such that the first reward of virtual currency is adjusted based on the revenue goal. The rewards of virtual currency may be adjusted to achieve the revenue goal, such that the rewards of virtual currency may be adjusted upward if the revenue information is on pace to miss the revenue goal over the period of time, and the rewards of virtual currency may be adjusted downward if the revenue information is on pace to exceed the revenue goal. Operation 212 may be performed by a reward module that is the same as or similar to reward module 120, in accordance with one or more implementations.

Figure 3:
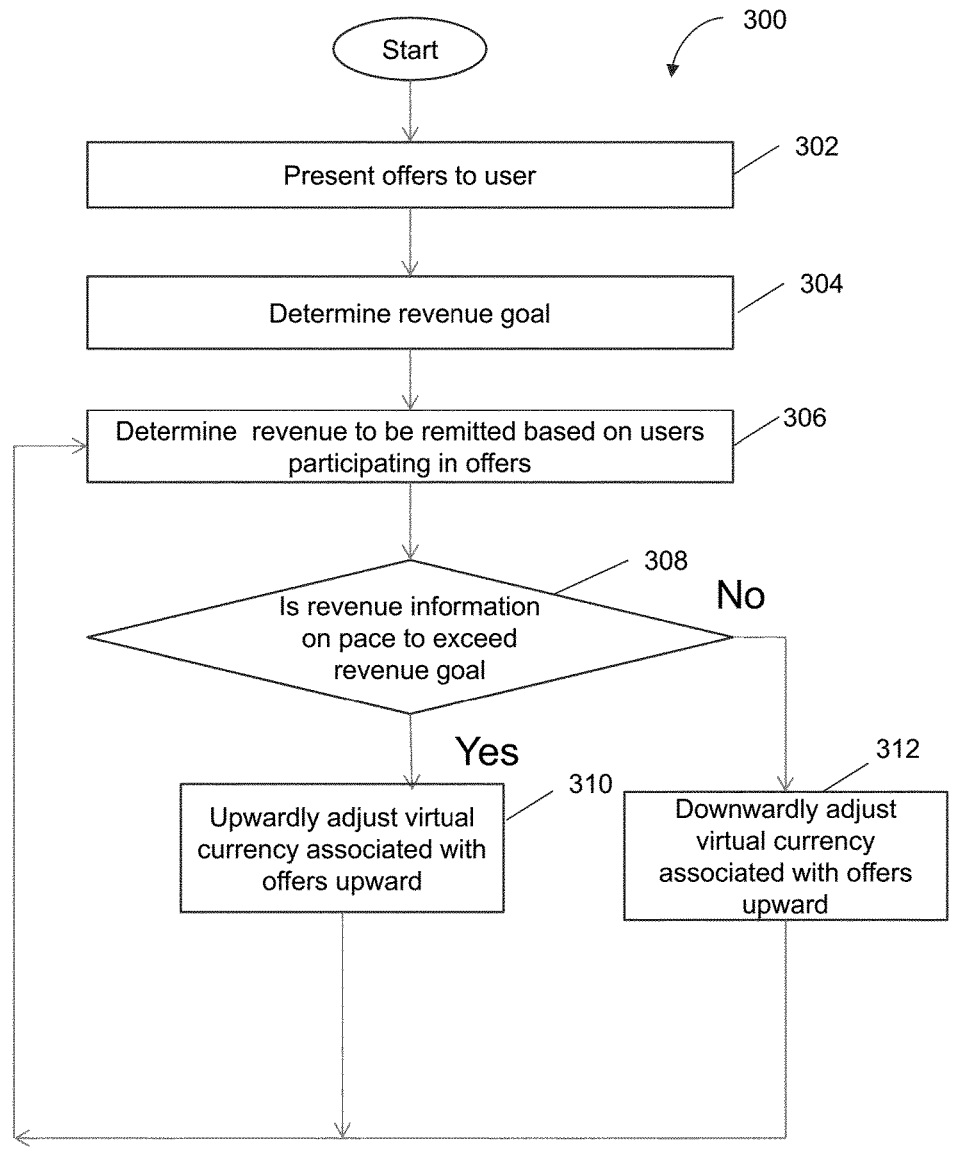
FIG. 3 illustrates a method of presenting offers for in-game virtual rewards, in accordance with one or more implementations.

FIG. 3 illustrates a method of presenting offers for in-game virtual rewards to users. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, received offers may be presented to a first user on a first client computing device through an offer interface such as an offer wall. The presented offers may include a first offer having a first action and a first reward of virtual currency usable in the virtual space that is transmitted to the user in response to the user accepting the first offer by performing the first action. Operation 302 may be performed by an offer presentation module that is the same as or similar to offer presentation module 114, in accordance with one or more implementations.

At an operation 304, a revenue goal may be determined. The determined revenue goal may be associated with an amount of revenue remitted to the virtual space provider by the offer providers over a period of time responsive to the users accepting the offers. In implementations, the revenue goal may be a dynamic revenue generation rate goal, at which revenue to be remitted to the virtual space provider accumulates and changes based on at least a time of day, a day of the week, or a day of the year. Operation 304 may be performed by a revenue goal module that is the same as or similar to revenue goal module 118, in accordance with one or more implementations.

At an operation 306, revenue information that represents revenue to be remitted to the virtual space provider based on acceptance of the offers by the users may be determined. Operation 306 may be performed by a revenue tracking module that is the same as or similar to revenue tracking module 116, in accordance with one or more implementations.

At an operation 308, the revenue information may be compared with the revenue goal to determine whether to increase the rewards of virtual currency associated with the offers. Operation 308 may be performed by a reward module that is the same as or similar to reward module 120, in accordance with one or more implementations.

At operation 310, responsive to a determination that the revenue information is on pace to miss the revenue goal, the rewards of virtual currency associated with at least one of the offers presented to at least one user may be adjusted upward. Returning to operation 308, responsive to a determination that the revenue is on pace to exceed the revenue goal, the rewards of virtual currency associated with at least one of the offers presented to at least one user may be adjusted downward at operation 312. Operations 310 and 312 may be performed by reward module that is the same as or similar to reward module 120, in accordance with one or more implementations.

In implementations if a user accepts a presented offer with an adjusted award by performing the action associated with the reward, method 300 may return to operation 306 where revenue to be remitted to the provider of the virtual space based on the offers participated in may be determined.

Figure 4:
FIG. 4 illustrates a screenshot of presented offers for in-game virtual rewards, in accordance with one or more implementations.

FIG. 4 depicts a screenshot 400 of a plurality of offers 410 being presented on an offer wall by a virtual space provider on a client computing device in accordance with one or more implementations.

Screenshot 400 may be presented on a user interface, such as in a webpage or mobile interface. The offers 410 presented to the users of an online game associated with the virtual space provider, and may include a number of different actions that can be performed by the users in exchange for virtual rewards. The offers 410 presented to the user may be provided by an offer provider, which may be an entity providing services and/or products that are presented to users of an online game to entice the users to try and/or purchase a service or product.

Rewards of virtual currency associated with offers 410 may be adjusted upward or downward to achieve a revenue goal. Further, the rewards of virtual currency may be adjusted to maintain the received revenue at, or near, the revenue goal. The rewards of virtual currency for offers 410 may be determined dynamically so as the meet, without exceeding, the revenue goal. When a user accepts an offer by performing an action associated with the offer, the offer provider may remit real world currency to virtual space provider. Responsive to the user performing the action to accept the offer, the user may be provided with the virtual currency associated with the reward, and the offer may be removed from the offer wall.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for presenting offers for in-game virtual rewards, the system comprising:
   one or more processors configured by machine-readable instructions to:
      execute an instance of a virtual space, and to use the instance of the virtual space to generate state information that is transmitted to client computing devices over a network, the state information facilitating presentation of views of the virtual space to users via the client computing devices, wherein execution of the instance includes performing operations in the instance in response to commands received over the network from the client computing devices to facilitate interaction with the virtual space by users via the client computing devices, the users including a first user that interacts with the virtual space through a client computing device;
      receive information associated with one or more offers from one or more offer providers, the offers including a first offer from a first offer provider, the first offer being associated with a first action, a first reward of virtual currency usable in the virtual space to be provided to one or more users responsive to the one or more users performing the first action, and a first amount of revenue to be remitted to a virtual space provider responsive to any user accepting the first offer and performing the first action;
      effectuate presentation of the offers to the users on the client computing devices through an offer interface;
      determine revenue information that represents revenue to be remitted to the virtual space provider based on acceptance of the offers by the users;
      obtain a revenue goal indicating a revenue related objective of the virtual space provider;
      determine the rewards of virtual currency associated with the offers based on a comparison of the revenue information with the revenue goal such that the first reward of virtual currency is adjusted based on the comparison of the revenue information with the revenue goal; and
      dynamically alter a location of the presentation of at least one of the offers within the virtual space to increase visibility of the at least one offer to the first user based at least in part on the revenue goal.

2. The system of claim 1, wherein the one or more processors are configured by machine-readable instructions to dynamically adjust the rewards of virtual currency to achieve the revenue goal.

3. The system of claim 2, wherein the dynamic alteration of the offers presented based on the revenue goal comprises maximizing visibility to the first user of offers similar to those the first user has accepted in the past in order to increase revenue generation.

4. The system of claim 1, wherein the revenue goal is associated with the revenue information over a period of time.

5. The system of claim 4, wherein the one or more processors are configured by machine-readable instructions to adjust the rewards upward when the revenue information is on pace to miss the revenue goal and to adjust the rewards downward when the revenue information is on pace to exceed the revenue goal.

6. The system of claim 1, wherein the revenue goal is associated with a revenue generation rate, at which revenue to be remitted to the virtual space provider accumulates.

7. The system of claim 6, wherein the revenue goal is dynamic over a period of time, wherein the revenue goal changes based on at least one of a time of day, a day of the week, or a day of the year.

8. The system of claim 6, wherein the one or more processors are configured by machine-readable instructions to adjust the rewards upward when the revenue generation rate is below the revenue goal and to adjust the rewards downward when the revenue generation rate is above the revenue goal.

9. The system of claim 1, wherein the rewards of virtual currency are limited by a maximum virtual currency reward threshold.

10. The system of claim 1, wherein the one or more processors are further configured by machine-readable instructions to dynamically alter at least one of the order and size of the offers presented to the first user based on the revenue goal.

11. A method for presenting offers for in-game virtual rewards, the method comprising:
    executing an instance of a virtual space, and using the instance of the virtual space to generate state information that is transmitted to client computing devices over a network, the state information facilitating presentation of views of the virtual space to users via the client computing devices, wherein execution of the instance includes performing operations in the instance in response to commands received over the network from the client computing devices to facilitate interaction with the virtual space by users via the client computing devices;
    receiving information associated with one or more offers from one or more offer providers, the offers including a first offer from a first offer provider, the first offer being associated with a first action, a first reward of virtual currency usable in the virtual space to be provided to one or more users responsive to the one or more users performing the first action, and a first amount of revenue;
    effectuating presentation of the offers to a first user on a first client computing device;
    determining revenue information that represents revenue to be remitted to the virtual space provider based on acceptance of the offers by the users;
    obtaining a revenue goal indicating a revenue related objective of the virtual space provider;
    determining the rewards of virtual currency associated with the offers based on a comparison of the revenue information with the revenue goal such that the first reward of virtual currency is adjusted based on the comparison of the revenue information with the revenue goal; and
    dynamically alter a location of the presentation of at least one of the offers within the virtual space to increase visibility of the at least one offer to the first user based at least in part on the revenue goal.

12. The method of claim 11, further comprising dynamically adjusting the rewards of virtual currency to achieve the revenue goal.

13. The method of claim 12, wherein the dynamic alteration of the offers presented based on the revenue goal comprises maximizing visibility to the first user of offers similar to those the first user has accepted in the past in order to increase revenue generation.

14. The method of claim 11, wherein the revenue goal is associated with the revenue information over a period of time.

15. The method of claim 14, further comprising adjusting the rewards upward when the revenue information is on pace to miss the revenue goal and adjusting the rewards downward when the revenue information is on pace to exceed the revenue goal.

16. The method of claim 11, wherein the revenue goal is associated with a revenue generation rate, at which revenue to be remitted to the virtual space provider accumulates.

17. The method of claim 16, wherein the revenue goal is dynamic over a period of time, wherein the revenue goal changes based on at least one of a time of day, a day of the week, a day of the year.

18. The method of claim 16, further comprising adjusting the rewards upward when the revenue generation rate is below the revenue goal and adjusting the rewards downward when the revenue generation rate is above the revenue goal.

19. The method of claim 11, further comprising dynamically altering at least one of the order and size of the offers presented to the first user based on the revenue goal.

20. The method of claim 11, wherein the rewards of virtual currency are limited by a maximum virtual currency reward threshold.

\* \* \* \* \*